(12) United States Patent
Miskiewicz et al.

(10) Patent No.: US 7,572,094 B2
(45) Date of Patent: Aug. 11, 2009

(54) APPARATUS AND METHOD FOR REORIENTING A STACK OF MAIL

(75) Inventors: Stephanie Miskiewicz, Ellicott City, MD (US); Patrick J. Cowgill, Catonsville, MD (US); Charles S. Shaw, Fairfax, VA (US); Jeffrey C. Lindhurst, Crofton, MD (US); Christopher R. Fedak, Ellicott City, MD (US); Stanely K. Wakamiya, Ellicott City, MD (US)

(73) Assignee: Northrop Grumman Corporation, Baltimore, MD (US)

(*) Notice: Subject to any disclaimer, the term of this patent is extended or adjusted under 35 U.S.C. 154(b) by 206 days.

(21) Appl. No.: 11/431,544

(22) Filed: May 11, 2006

(65) Prior Publication Data

US 2006/0267268 A1 Nov. 30, 2006

Related U.S. Application Data

(60) Provisional application No. 60/682,409, filed on May 19, 2005.

(51) Int. Cl.
*B65G 7/08* (2006.01)
*B65G 65/04* (2006.01)
*B65B 21/02* (2006.01)

(52) U.S. Cl. .................. 414/758; 414/425; 414/783; 414/416.03; 414/416.04

(58) Field of Classification Search .................. 221/156; 53/381.2, 392; 414/403–405, 407, 413–414, 414/418–422, 424–425, 764, 766–767, 771, 414/783–784, 416.03–416.04, 416.09, 416.11; 206/555; 271/124
See application file for complete search history.

(56) References Cited

U.S. PATENT DOCUMENTS

| | | | | |
|---|---|---|---|---|
| 3,283,931 | A * | 11/1966 | Gerrans | 414/416.09 |
| 4,919,589 | A * | 4/1990 | Krappitz et al. | 414/798.9 |
| 5,067,303 | A * | 11/1991 | Brookman et al. | 53/381.2 |
| 5,271,710 | A * | 12/1993 | Decharran et al. | 414/798.9 |
| 5,772,383 | A * | 6/1998 | Kalika et al. | 414/403 |
| 6,336,782 | B1 * | 1/2002 | Pawlak et al. | 414/403 |
| 6,398,008 | B1 * | 6/2002 | Suga | 198/404 |

FOREIGN PATENT DOCUMENTS

WO WO-99/20530 4/1999

* cited by examiner

*Primary Examiner*—Gregory W Adams
(74) *Attorney, Agent, or Firm*—Andrews Kurth LLP

(57) ABSTRACT

Mail reorientation apparatus which transfers horizontally oriented mail stack in an input tray to a vertical orientation in an output tray. The input tray is brought to a rotating station where a plate is brought down on top of the mail stack and a plurality of pusher rods are extended through apertures in the bottom of the input tray to contact the bottom of the mail stack. The rotation process orients the mail stack to the desired vertical orientation and the rods and plate are simultaneously moved to eject the mail from the input tray to the output tray.

22 Claims, 18 Drawing Sheets

APPARATUS AND METHOD FOR REORIENTING A STACK OF MAIL

CROSS REFERENCE TO RELATED APPLICATIONS

The present application claims the benefit of priority of U.S. provisional patent application Ser. No. 60/682,409 filed on May 19, 2005, which is hereby expressly incorporated by reference.

BACKGROUND OF THE INVENTION

1. Field of the Invention

The invention in general relates to postal delivery, and more particularly to apparatus and a method for reorienting a stack of mail from an input tray to an output tray for delivery from a mail truck.

2. Description of Related Art

In one type of mail delivery operation, mail is sorted at a post office and placed horizontally in a tray. The tray is then placed on a shelf in a mail delivery truck next to the mail carrier. The mail carrier verifies the address on the top piece of mail as the carrier approaches a mail delivery point.

The postal service has expressed a desire to have the mail in the tray oriented vertically as opposed to horizontally, to make for easier reading of addresses on the mail. Such mail includes conventional letters as well as flats, which is mail of a larger designated size and includes magazines and catalogs, for example.

The present invention provides apparatus and a method to accommodate the postal service desire for vertical orientation of mail.

SUMMARY OF THE INVENTION

Apparatus for reorienting a mail stack includes a mail input tray having a horizontally oriented mail stack therein. A rotating station is provided for receiving the input tray with the mail stack. A mail output tray is positioned adjacent the rotating station. An actuator mechanism places a plate adjacent the top of the horizontally oriented mail stack for holding the mail stack in the input tray during a subsequent rotation process. A motor is coupled to rotate the rotating station with the input tray, so that the mail stack therein assumes a vertical orientation. Ejection apparatus ejects the vertically oriented mail stack from the input tray to the output tray for mail delivery.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein.

DESCRIPTION OF THE PREFERRED EMBODIMENTS

Figure 1:
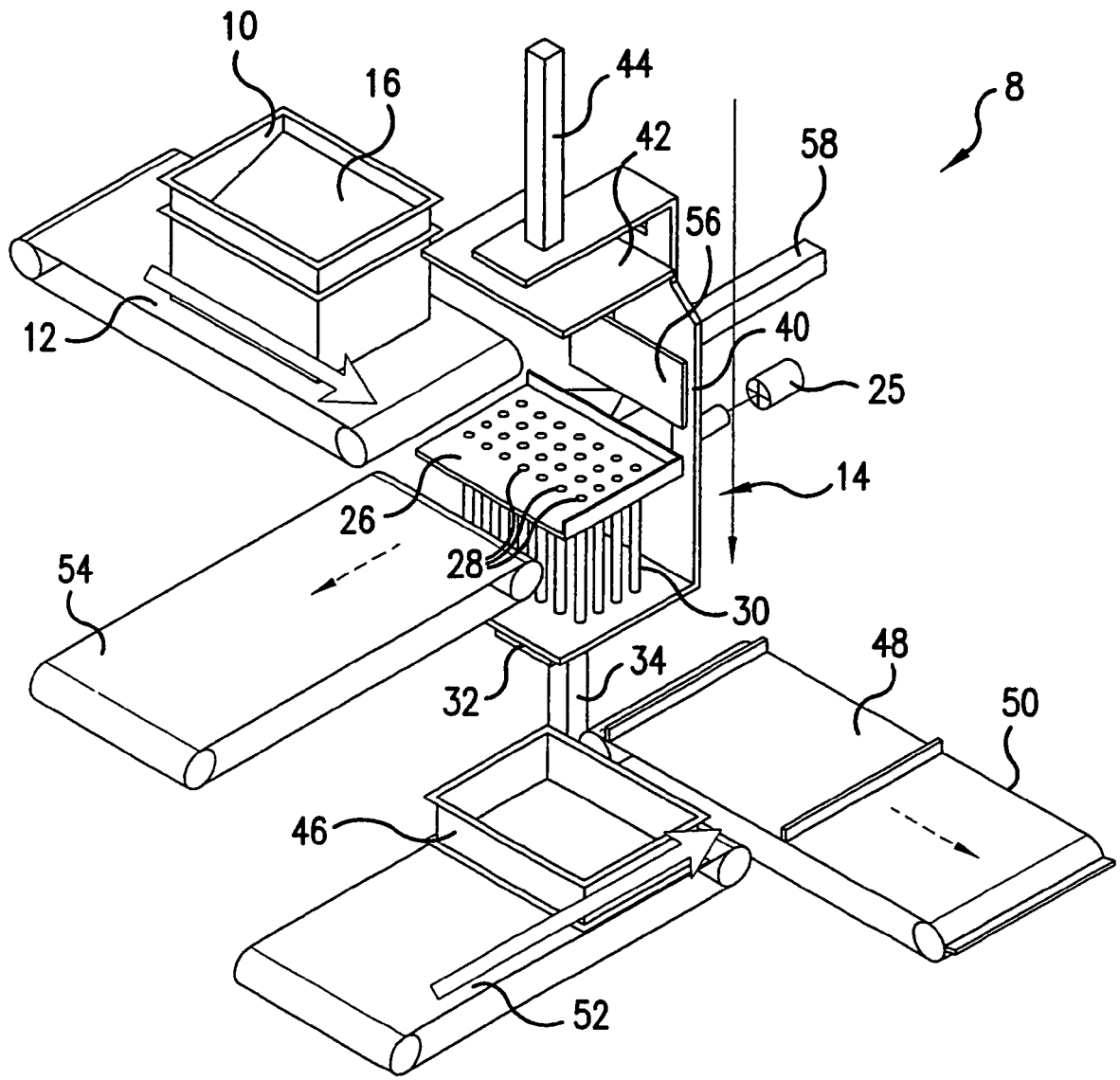
FIGS. 1 to 9 illustrate various views of one embodiment of the present invention with FIG. 1A illustrating a cut-away side view of a mail input tray and FIG. 1B illustrating a plan view.

Referring now to FIG. 1, there is illustrated mail reorienting apparatus 8 having a mail input tray 10 which is delivered by an input tray feed conveyer 12 to a rotating station 14. In order to keep the mail stack 16 aligned and prevented from falling over, the input tray 10 may optionally include an insert as illustrated in FIGS. 1A and 1B, to which reference is now made.

Figure 1A:
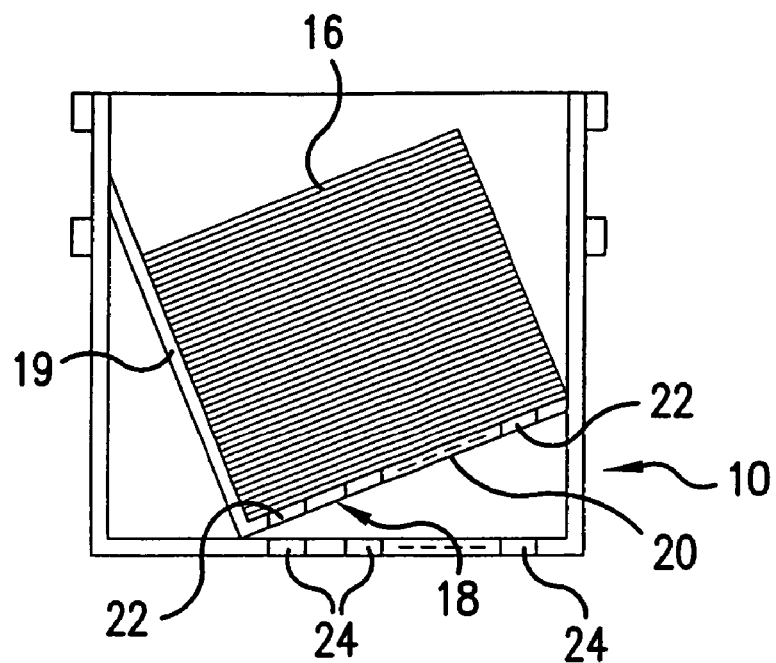
Figure 1B:
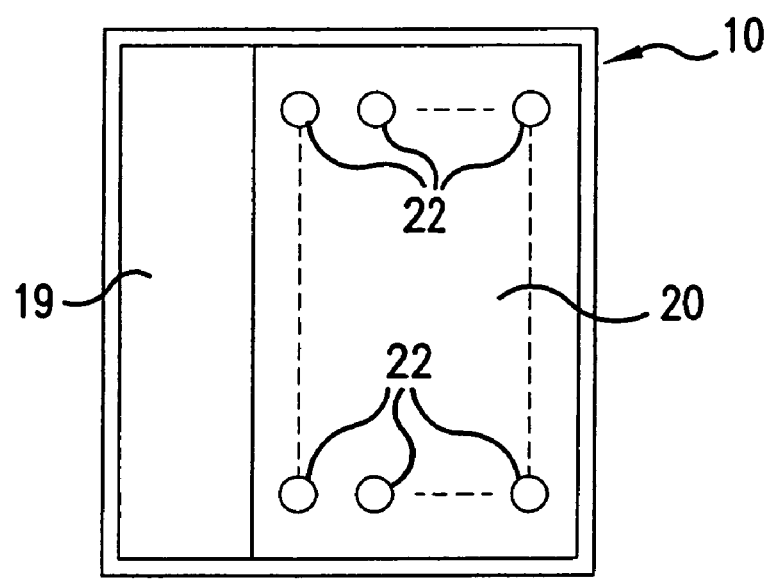

As seen in the side view of FIG. 1A, the insert 18 includes a sloping wall portion 19 and a sloping floor portion 20 upon which the mail stack 16 rests in a horizontal orientation with address labels facing up. With this arrangement the tops of letters and the spines of magazines, and the like, of the mail stack 16, abut the wall portion 19 to keep the stack stable. As best seen in FIG. 1B, shown without the mail stack 16, the floor portion 20 includes a plurality of apertures, or slots 22. The bottom of input tray 10 (FIG. 1A) includes a similar plurality of slots 24.

Referring once again to FIG. 1, the rotating station 14, rotatable by motor 25, includes a transfer deck 26 having a plurality of apertures 28 through which pusher rods 30 are extendable when moved by pusher plate 32, activated by actuator mechanism 34. The rotating station 14 additionally includes a frame member 40 coupled to motor 25 and which carries plate 42, moveable by actuator mechanism 44.

An output tray 46 is delivered to location 48 of output tray take away conveyer 50, adjacent rotating station 14, by means of an output tray feed conveyer 52, while empty input trays are removed from transfer deck 26 by means of input tray take away conveyer 54. The empty input tray 10 is moved to the input tray take away conveyer 54 by operation of plate 56 moved by actuator mechanism 58, both of which are carried by frame 40. In the embodiment of FIG. 1, the input tray feed conveyer 12 and input tray take away conveyer 54 are perpendicular to one another, as is output tray feed conveyer 52 and output tray take away conveyer 50.

Figure 2:
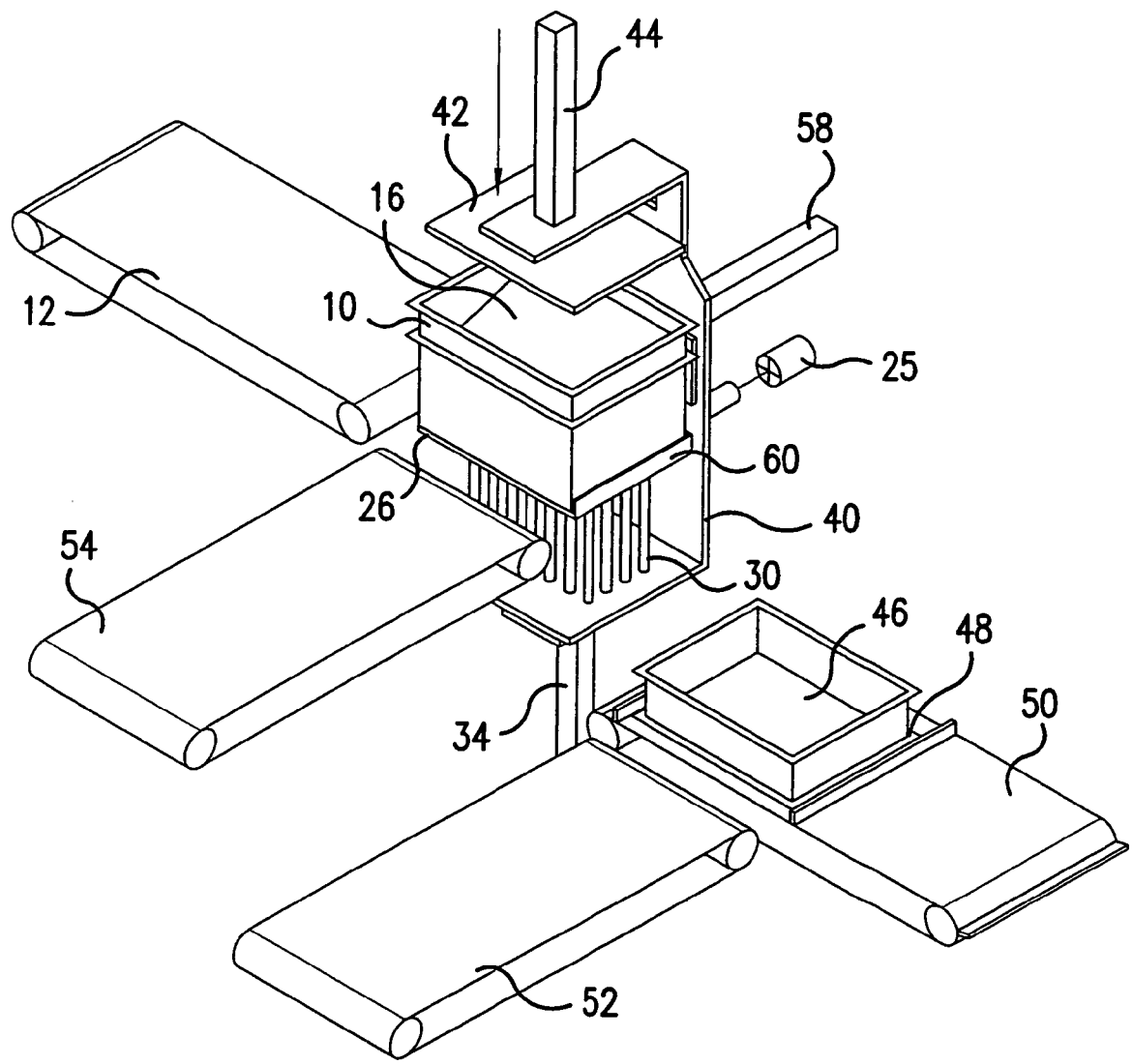
Figure 3:
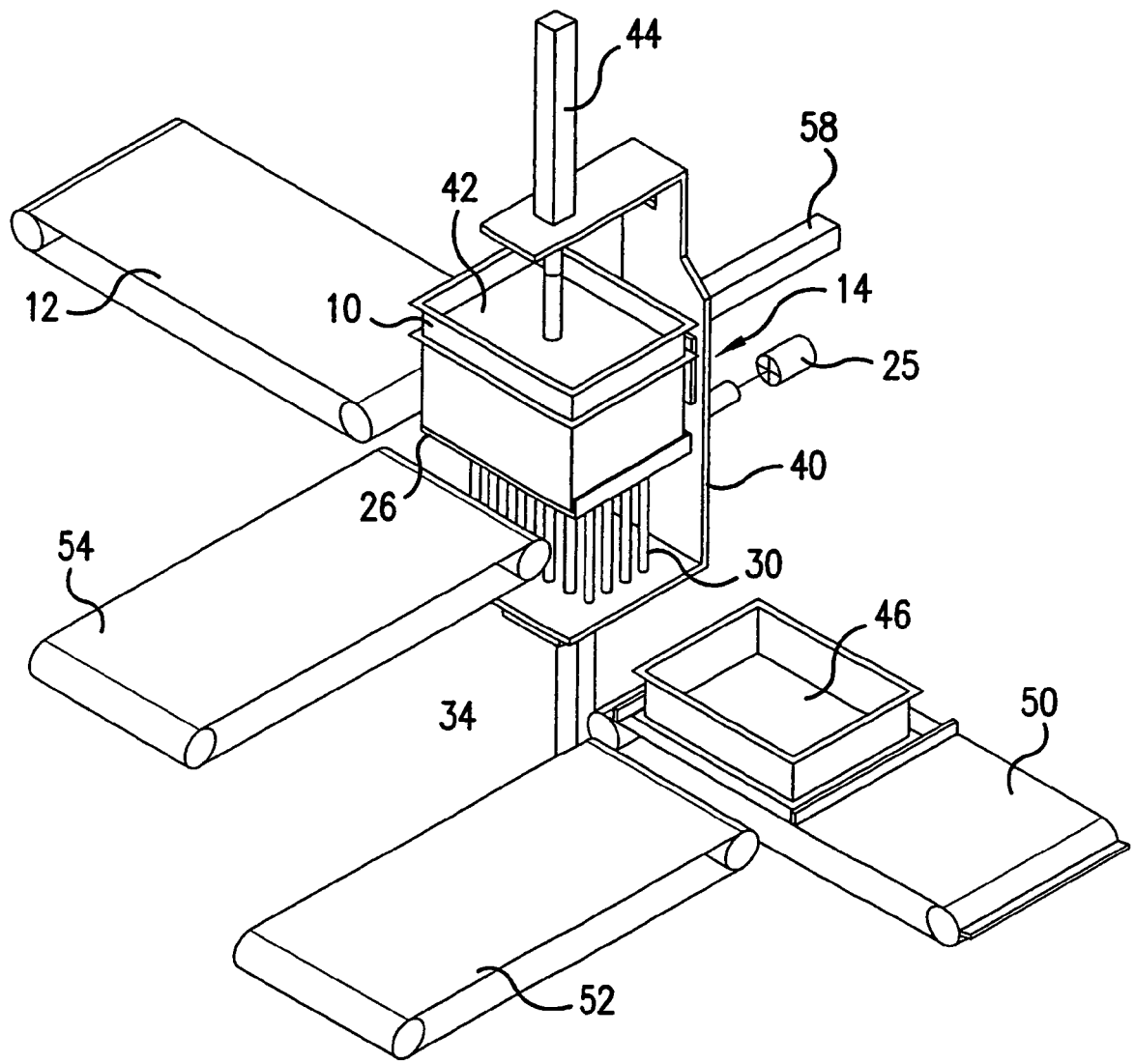

In FIG. 2 input tray 10 has been delivered to transfer deck 26 and is prevented from further movement by lip 60 of transfer deck 26. Output tray 46 has been delivered to location 48 of the output tray take away conveyer 50. At this point in the process, and as indicated in FIG. 3, actuator mechanism 44 lowers plate 42 into the input tray 10 to stabilize the stack of mail.

Figure 4:
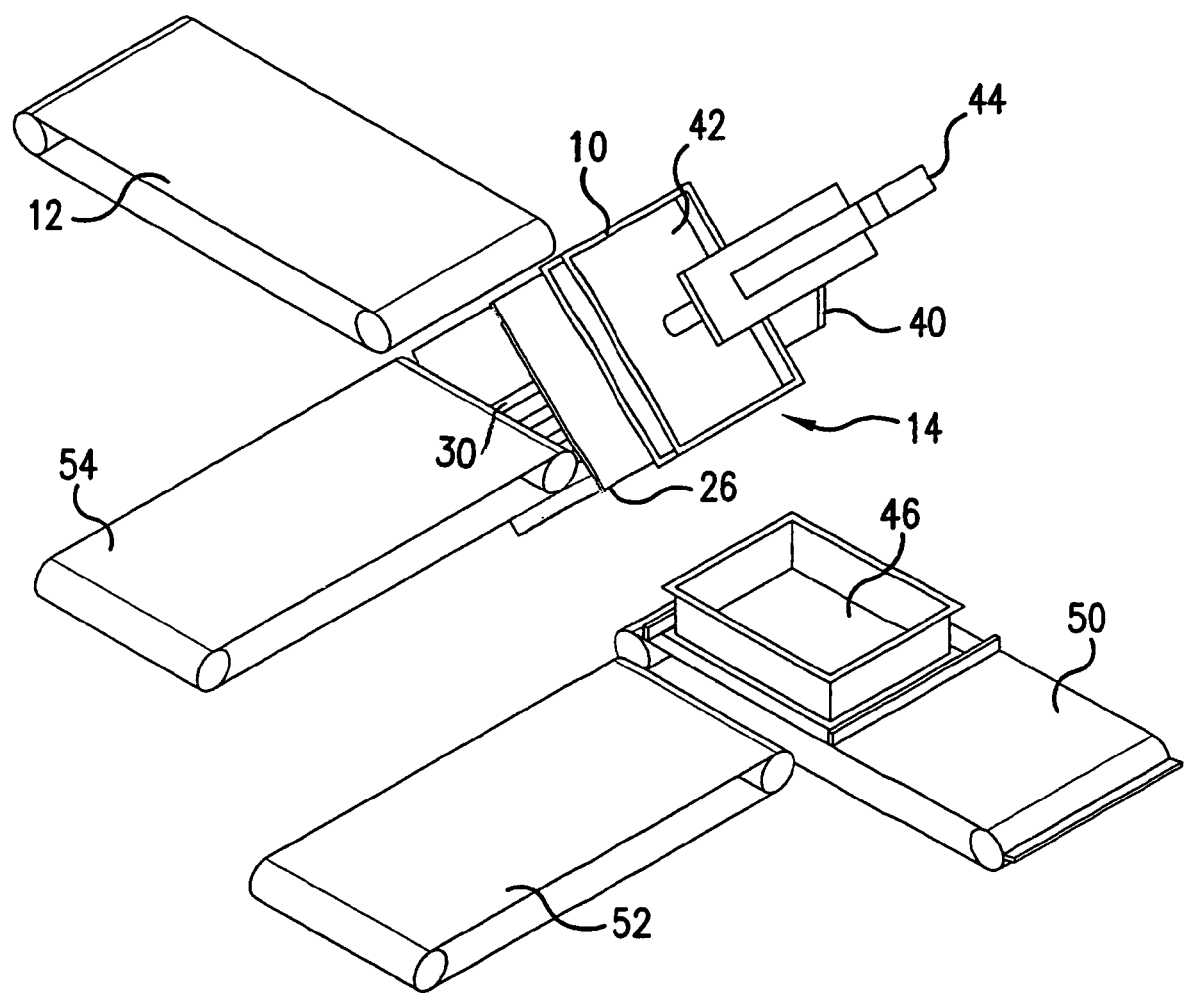

When plate 42 is just above the height of the mail stack as detected by a sensor such as a photo eye (not illustrated) movement of the plate 42 is stopped. This position of plate 42 helps stabilize the mail by constraining the mail between the plate 42 at the top of the mail stack, and the floor portion 20 of insert 18 (FIG. 1). in input tray 10, during the rotation and transfer process to follow. In the process, plate 42 does not apply a compressive force on the mail stack. Initial rotation is illustrated in FIG. 4.

Figure 5:
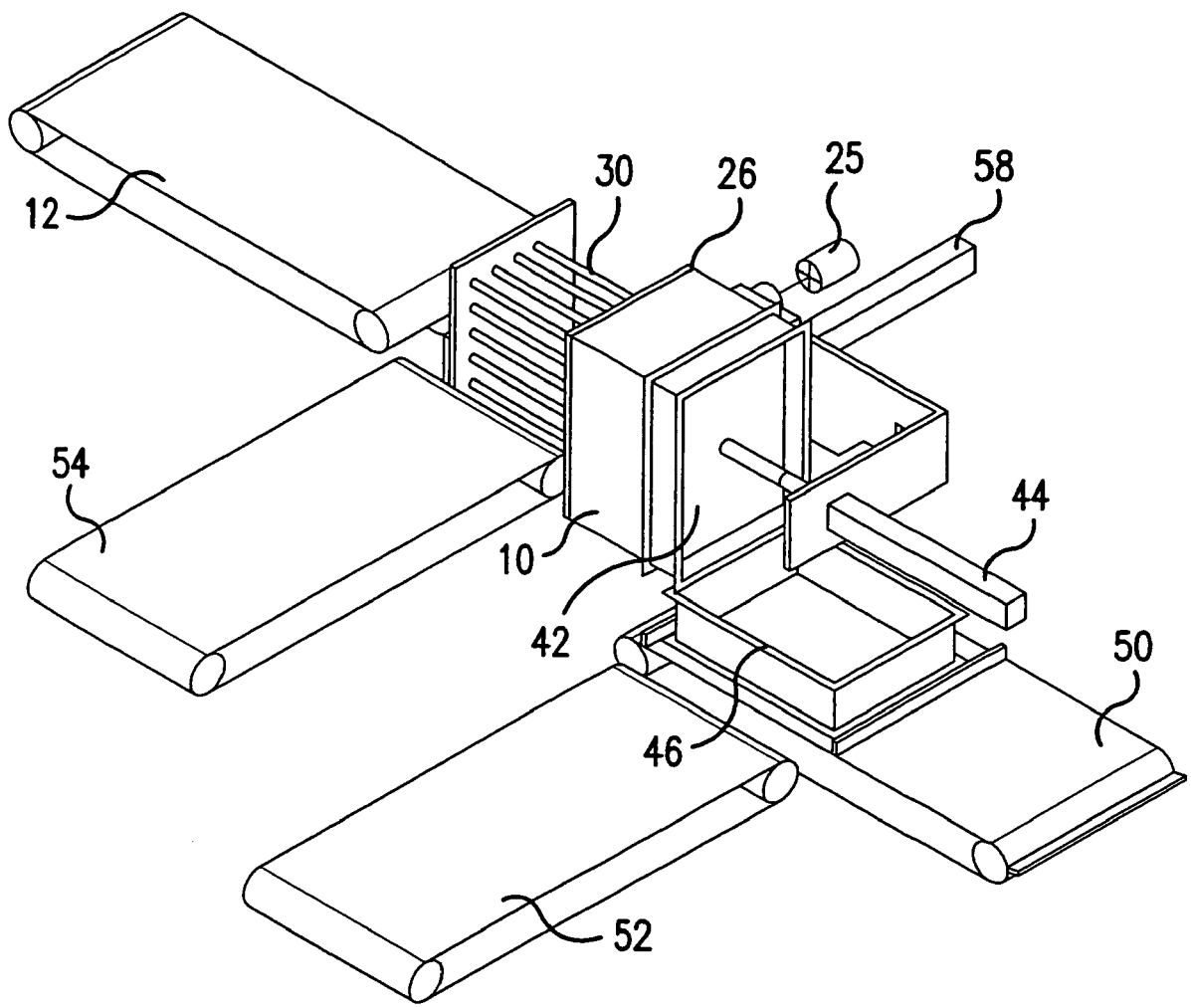

As illustrated in FIG. 5, input tray 10 has been rotated 90° from its initial position which puts the mail stack in a vertical orientation. The rotation process also places the input tray 10 in the correct relationship with the output tray 46 to facilitate the transfer of mail.

Figure 6:
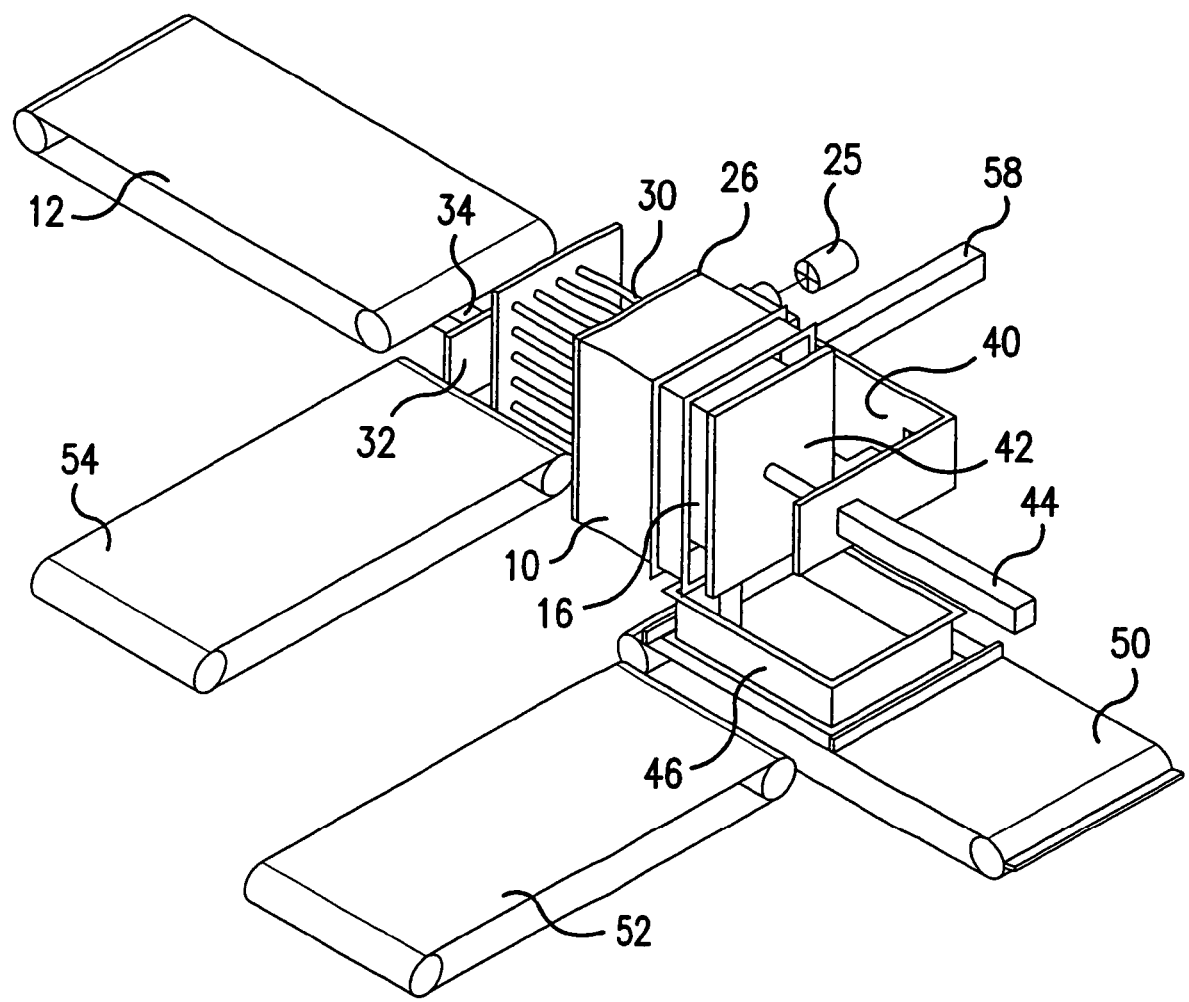

In FIG. 6, actuator mechanism 34 moves plate 32 such that rods 30 are inserted in the matching slots 24 in the bottom of input tray 10 and push on the back of the mail stack through the slots 22 in floor portion 20 of insert 18 (FIGS. 1A and 1B). At the same time, actuator mechanism 44 retracts plate 42 at the same rate of advancement as rods 30 such that the space between the end of the rods 30 and plate 42 remains constant so that the mail stack is loosely supported between the rods 30 and plate 42. The spacing and pattern of rods 30 are the same as the slots 24 in the bottom of input tray 10, however rods 30 are somewhat smaller in size than the slots 24 to accommodate for any potential misalignments.

Figure 7:
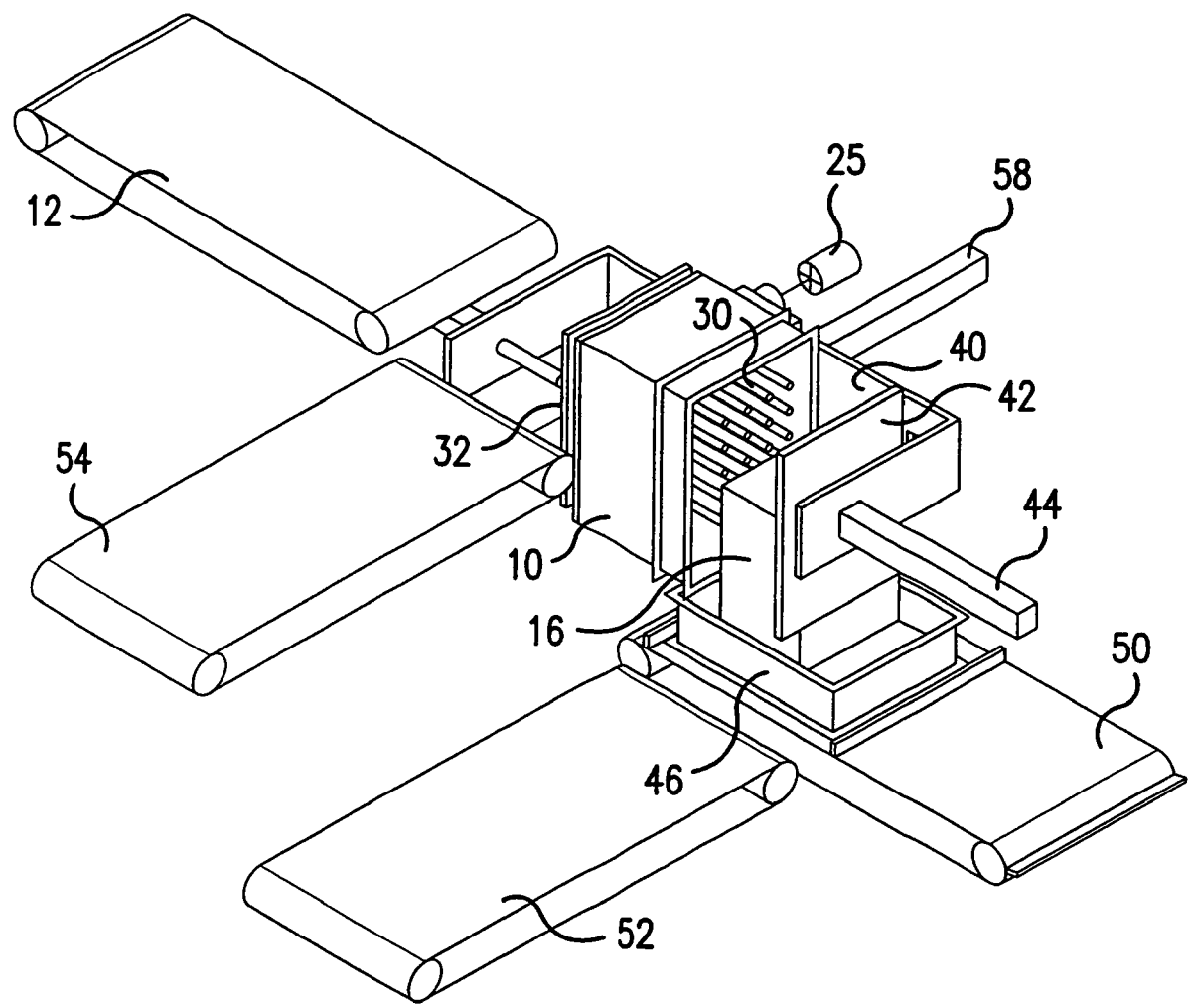
Figure 8:
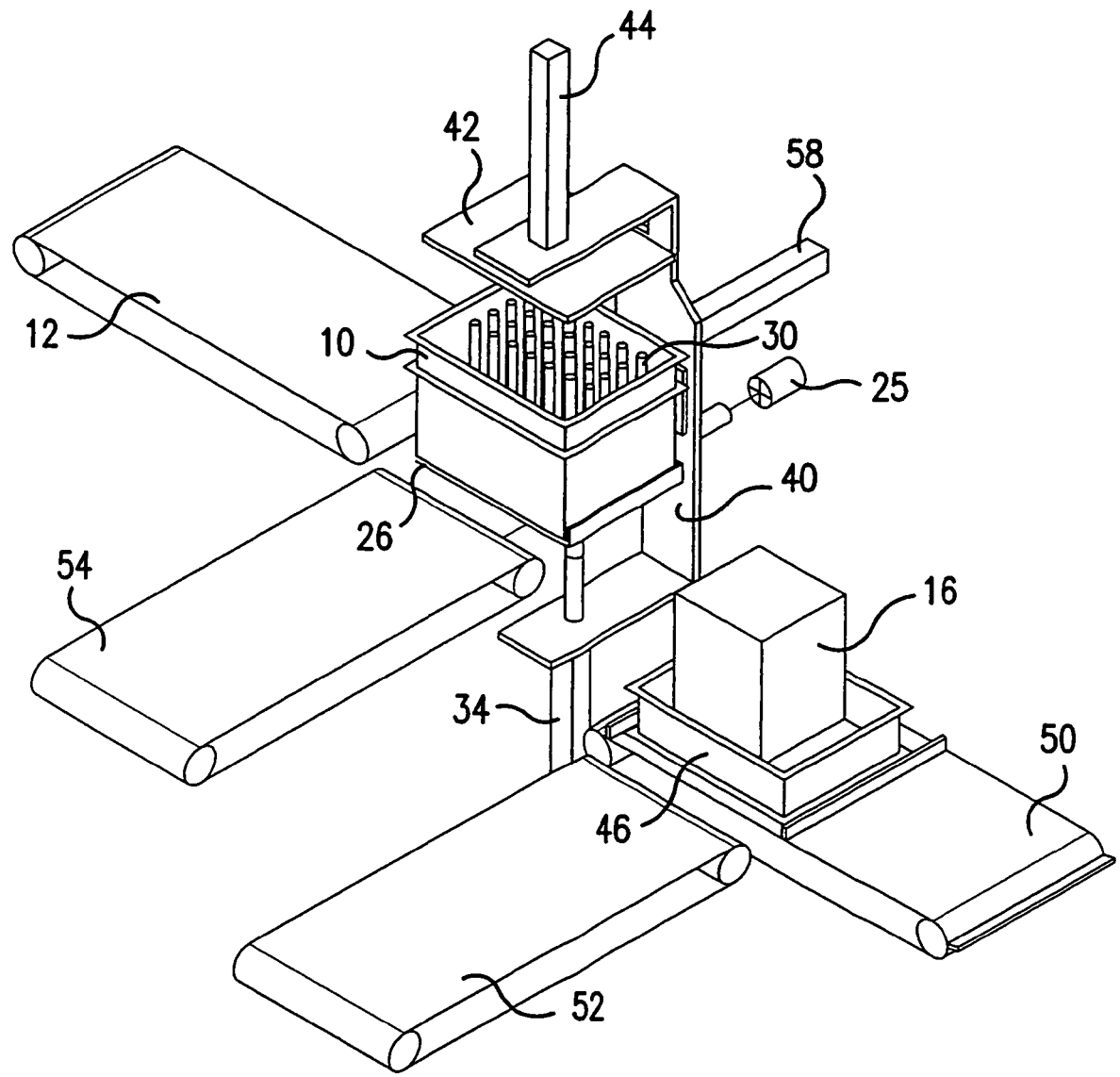
Figure 9:
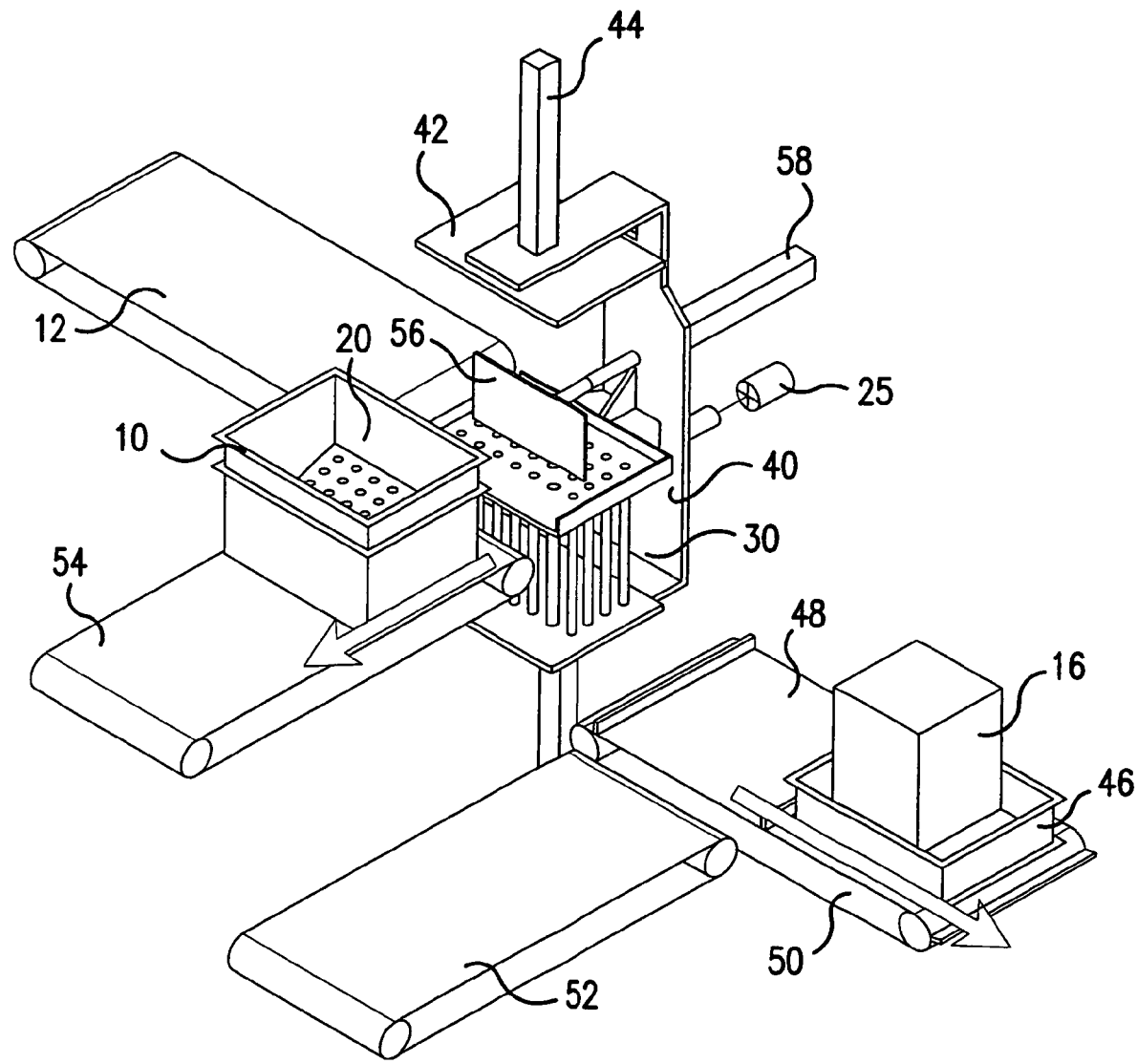

The rods 30, constituting ejection apparatus, are extended all the way, such that, as illustrated in FIG. 7, the mail stack 16 is quickly ejected into the output tray 46. After this ejection the rotating station 14 is rotated to its initial position, as seen in FIG. 8. Rods 30 are then retracted, as illustrated in FIG. 9, and actuator mechanism 58 moves plate 56 to push input tray 10 onto the input tray take away conveyer 54 where it is placed in a staging area, while output tray 46, filled with vertically oriented mail, is moved to a dispatch queue. The apparatus has completed a cycle and is now ready for the next input tray, with the change in orientation process taking about 8 to 10 seconds.

Another embodiment of the present invention is illustrated in FIGS. 10 to 17. One difference between the embodiment of FIGS. 1 to 9 and that of FIGS. 10 to 17 is that in the embodiment of FIGS. 1 to 9 vertical rods 30 rotate with the rotating station 14, whereas they remain horizontal in the embodiment of FIGS. 10 to 17.

Figure 10:
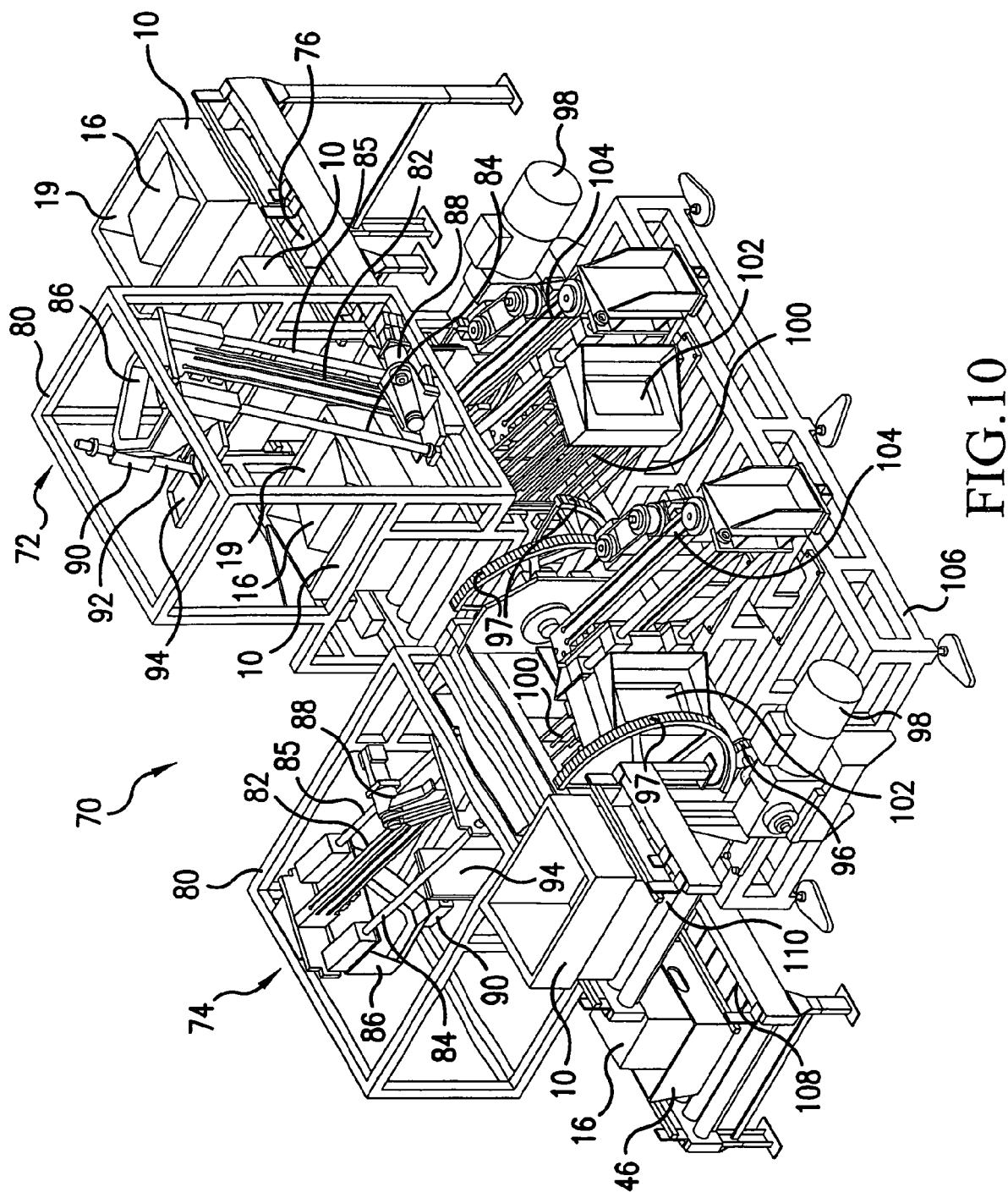
FIGS. 10 to 17 illustrate various views of another embodiment of the present invention.

FIG. 10. illustrates mail reorienting apparatus 70 having plurality of rotating stations, with two, 72 and 74, being illustrated by way of example. Similar components at each station have been given similar reference characters. Rotating station 72 is illustrated in an upright vertical position while rotating station 74 is illustrated in a rotated horizontal orientation.

Each rotating station 72 and 74 includes a frame 80 in which is positioned a linear actuator arrangement 82. The linear actuator arrangement 82 has first and second rods 84 and 85 along which a yoke assembly 86 is moveable by means of motor 88. Yoke assembly 86 is connected to a linear bearing 90 through which passes a rod 92 connected at its end to a plate 94 which will contact the mail stack 16, similar in operation to plate 42 of FIG. 1. Frame 80 is rotated from its vertical position (72) to its horizontal position (74) by means of gears 96 and 97 connected for rotation by motor 98.

The apparatus includes an assembly of pusher rods 100 mounted at one end to a rod mounting assembly 102 connected to a linear drive arrangement 104 which functions to move the rods 100 in a horizontal direction from a retracted position shown at station 72 to an extended position shown at station 74.

Figure 11:
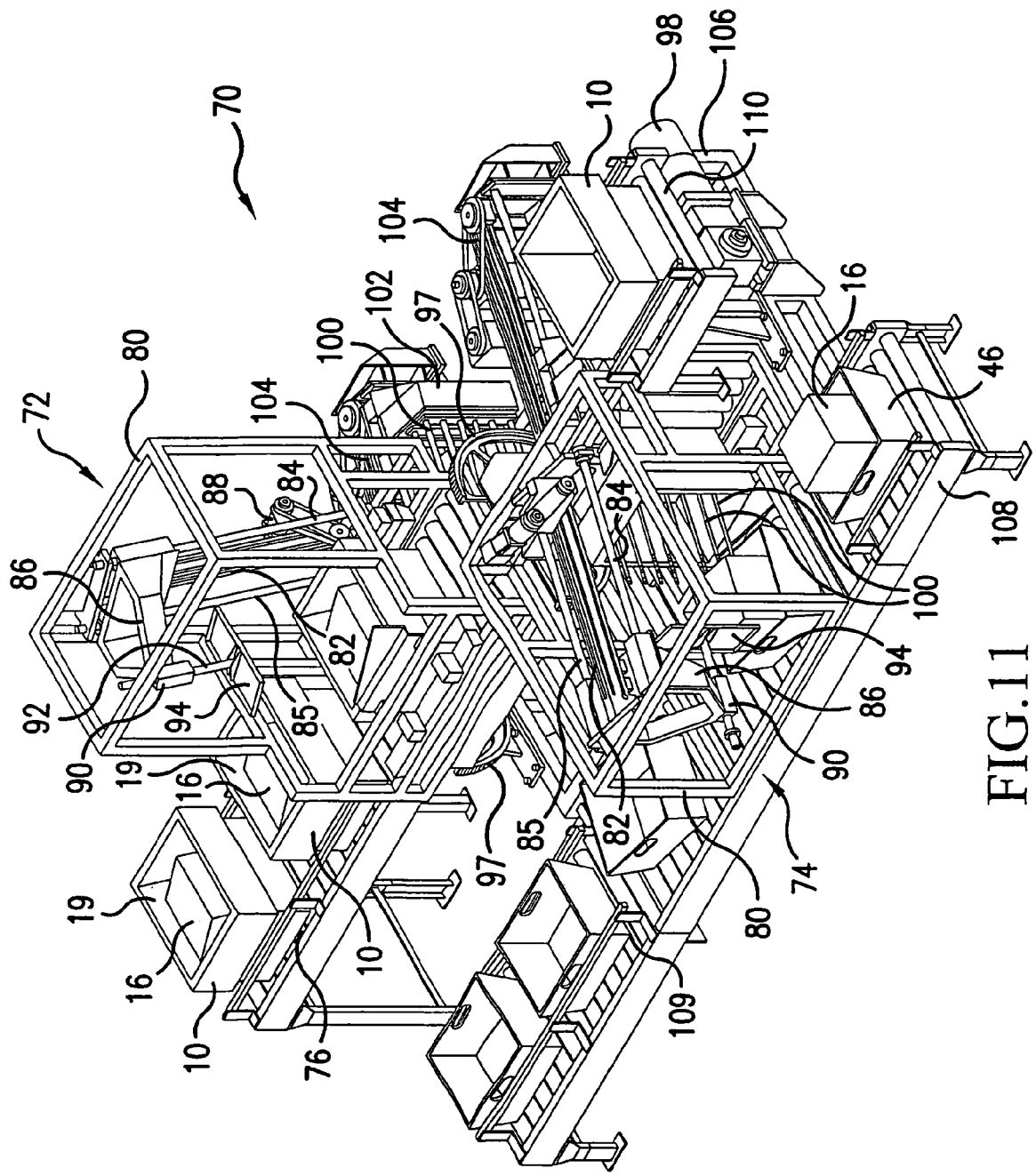

Motors 98 as well as the linear drive arrangements 104 are mounted on a box frame 106. FIG. 10 additionally illustrates the transferred mail stack 16 in an output tray 46 on an output tray take away conveyer 108. An empty input tray 10 on an input tray take away conveyer 110 is also shown. FIG. 11 illustrates the apparatus of FIG. 10, from the opposite side. An output tray feed conveyer 109 may be seen in FIG. 11. FIG. 11 illustrates that the respective input and take away conveyers are in line, as opposed to being perpendicular to one another, as in FIG. 1.

Figure 12:
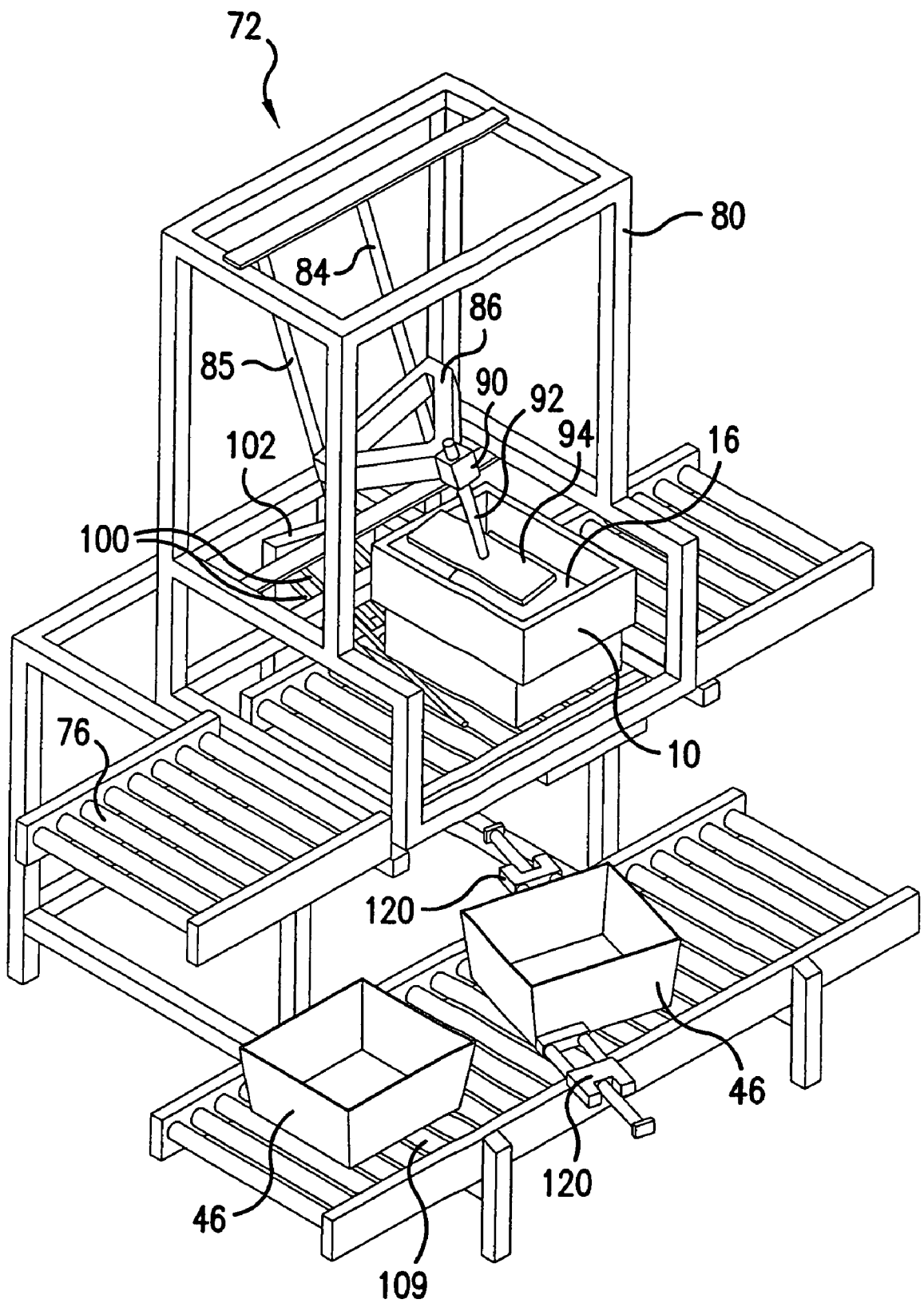
Figure 13:
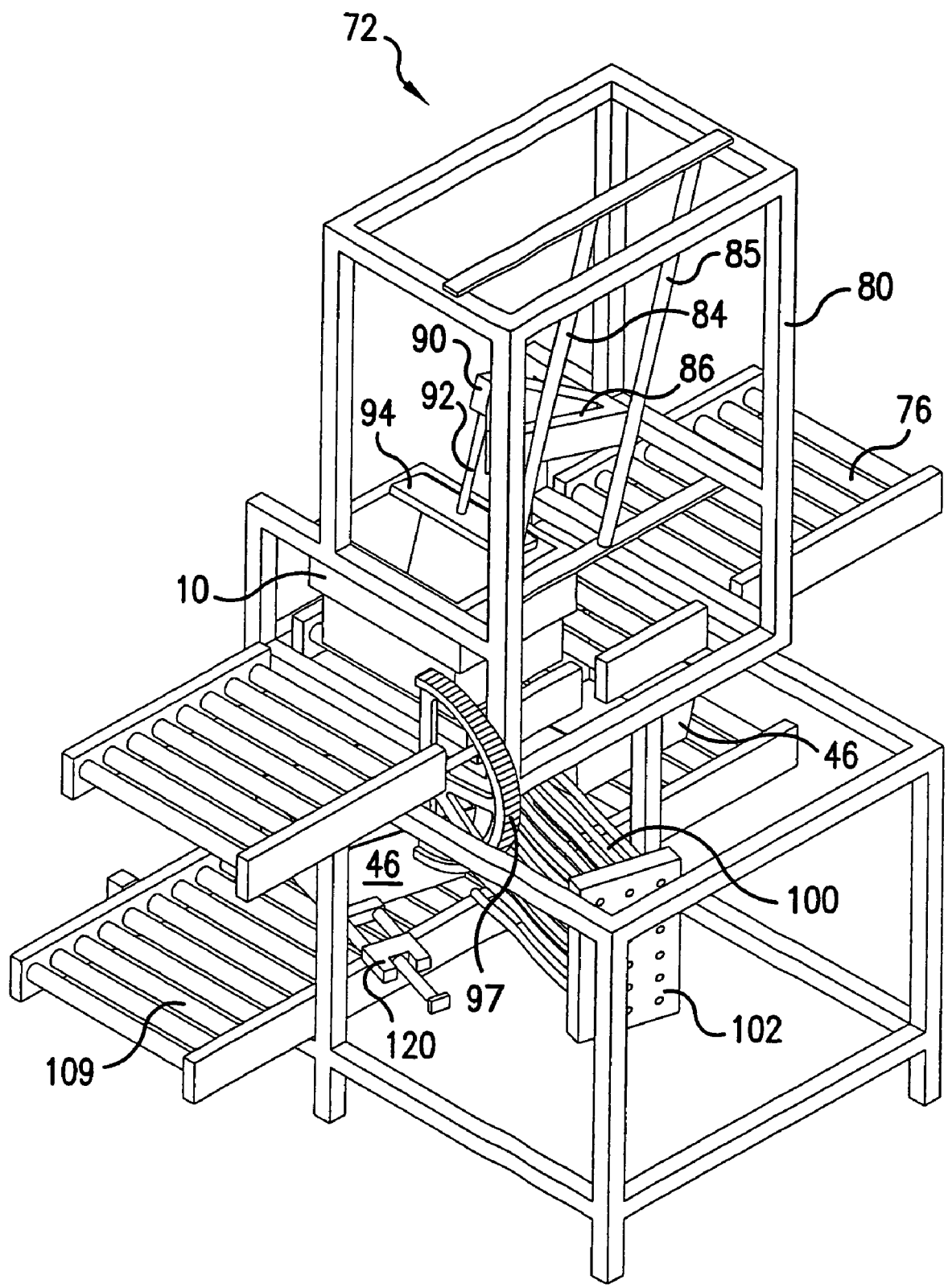

FIG. 12 illustrates a single rotating station, 72 for example, from the opposite side shown in FIG. 10. For clarity, in FIG. 12 and subsequent FIGS, various drive mechanisms have not been illustrated. In order to properly orient an output tray 46 to receive mail from an input tray 10, a pair of tray orientation devices 120 are provided and are secured on opposite sides of conveyer 108. An output tray 46 traveling along conveyer 108 is forced to the skewed angle shown when the devices 120 are encountered. FIG. 13 illustrates the arrangement from the opposite side.

Figure 14:
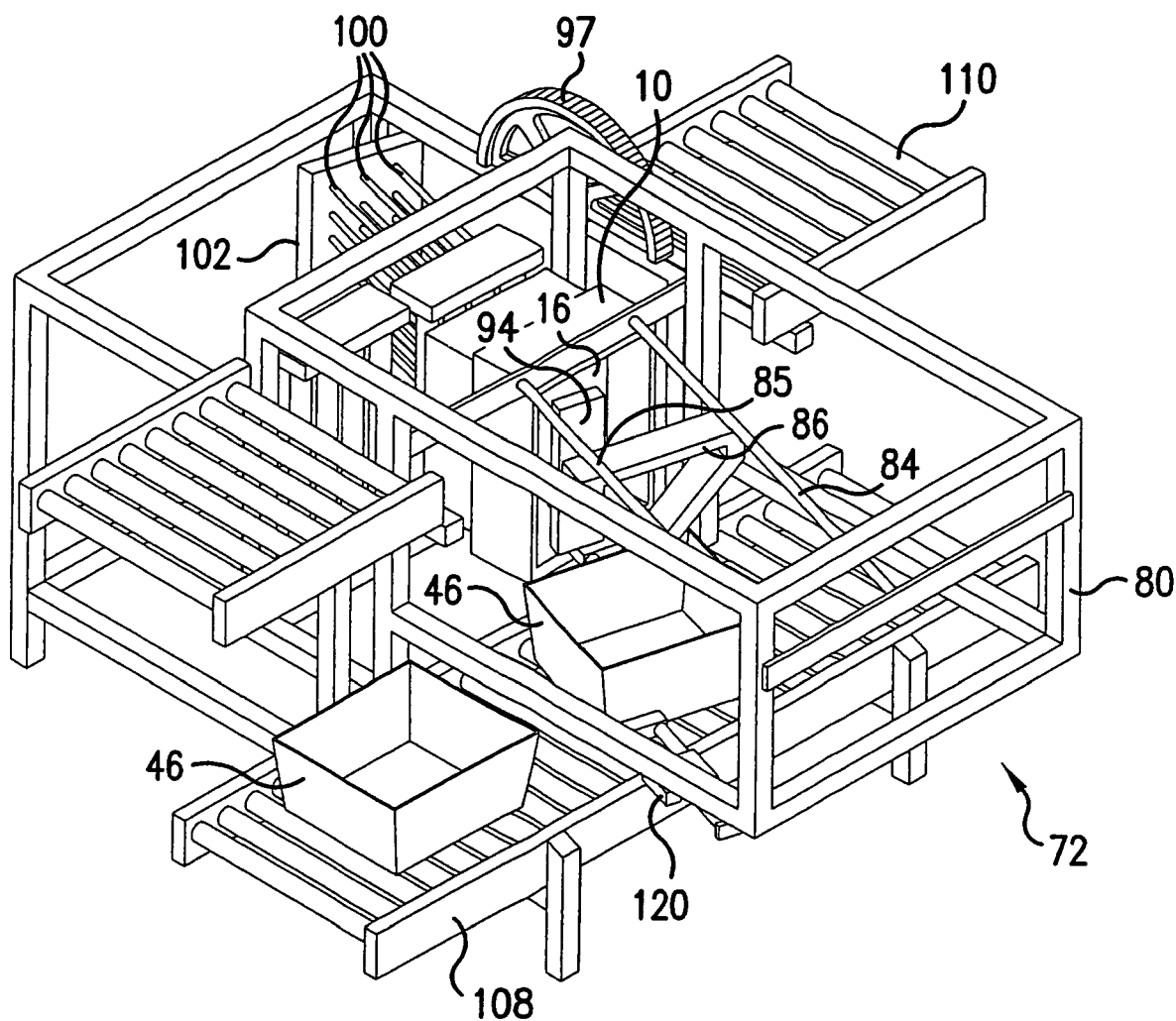
Figure 15:
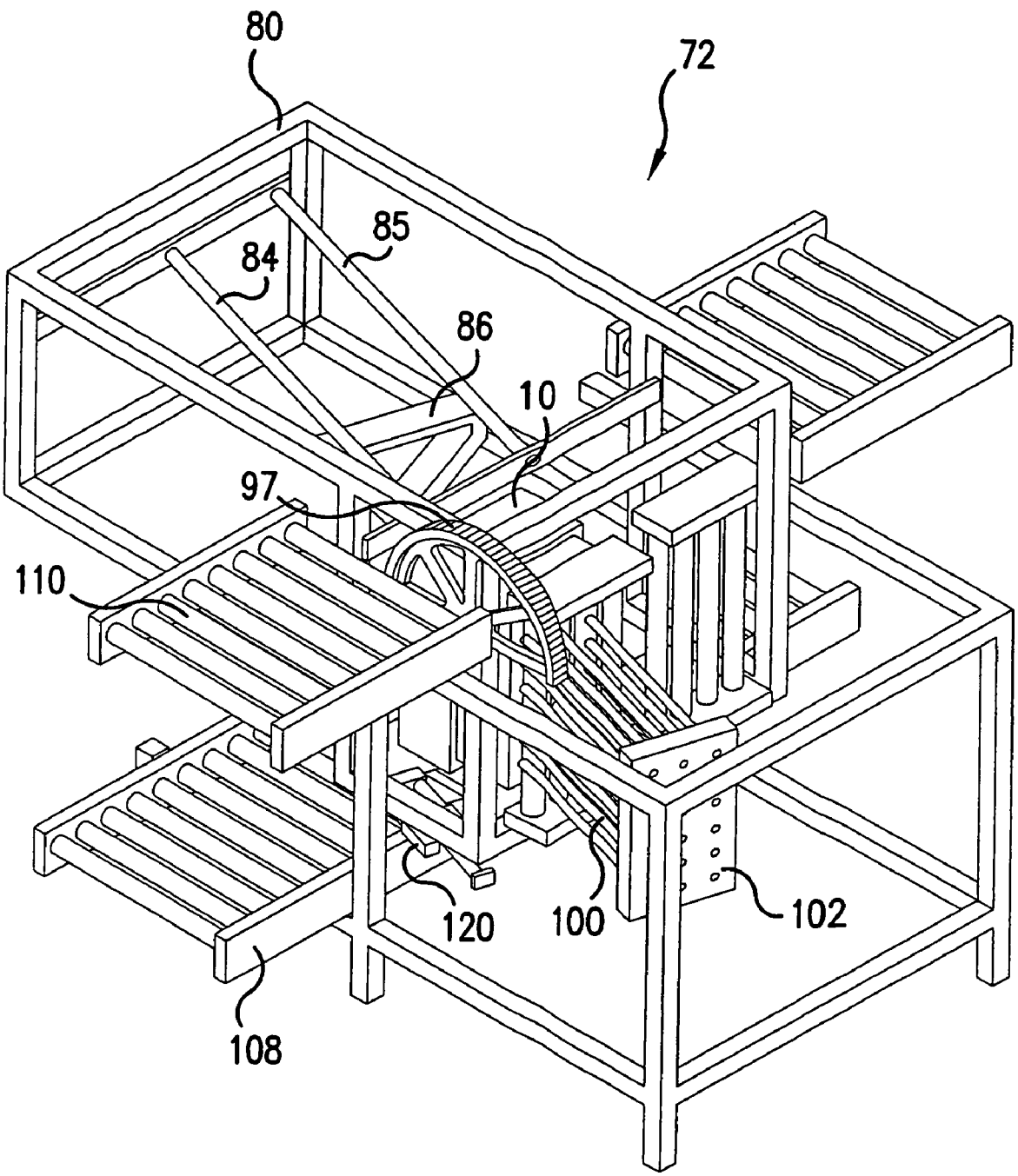

In FIG. 14 frame 80 has been rotated to a horizontal position by the gearing including gear 97. Prior to this rotation, yoke 86 was lowered such that plate 94 is positioned adjacent the top of the mail stack 16 whereupon motion is stopped by a sensor (not illustrated). The arrangement is then ready for the rods 100 to be extended through the slots in the bottom of the input tray 10. A view of the arrangement from the opposite side is illustrated in FIG. 15.

Figure 16:
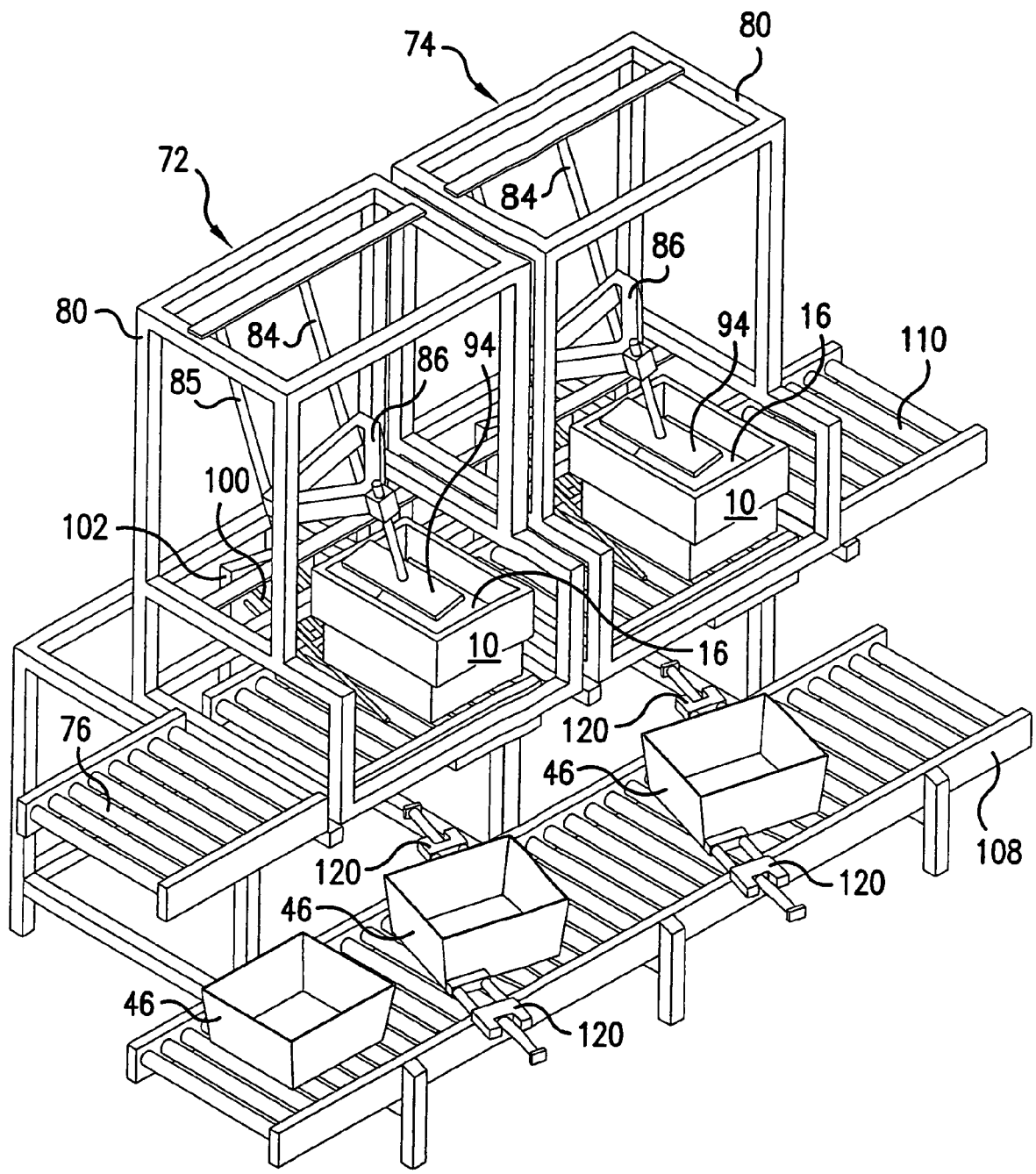
Figure 17:
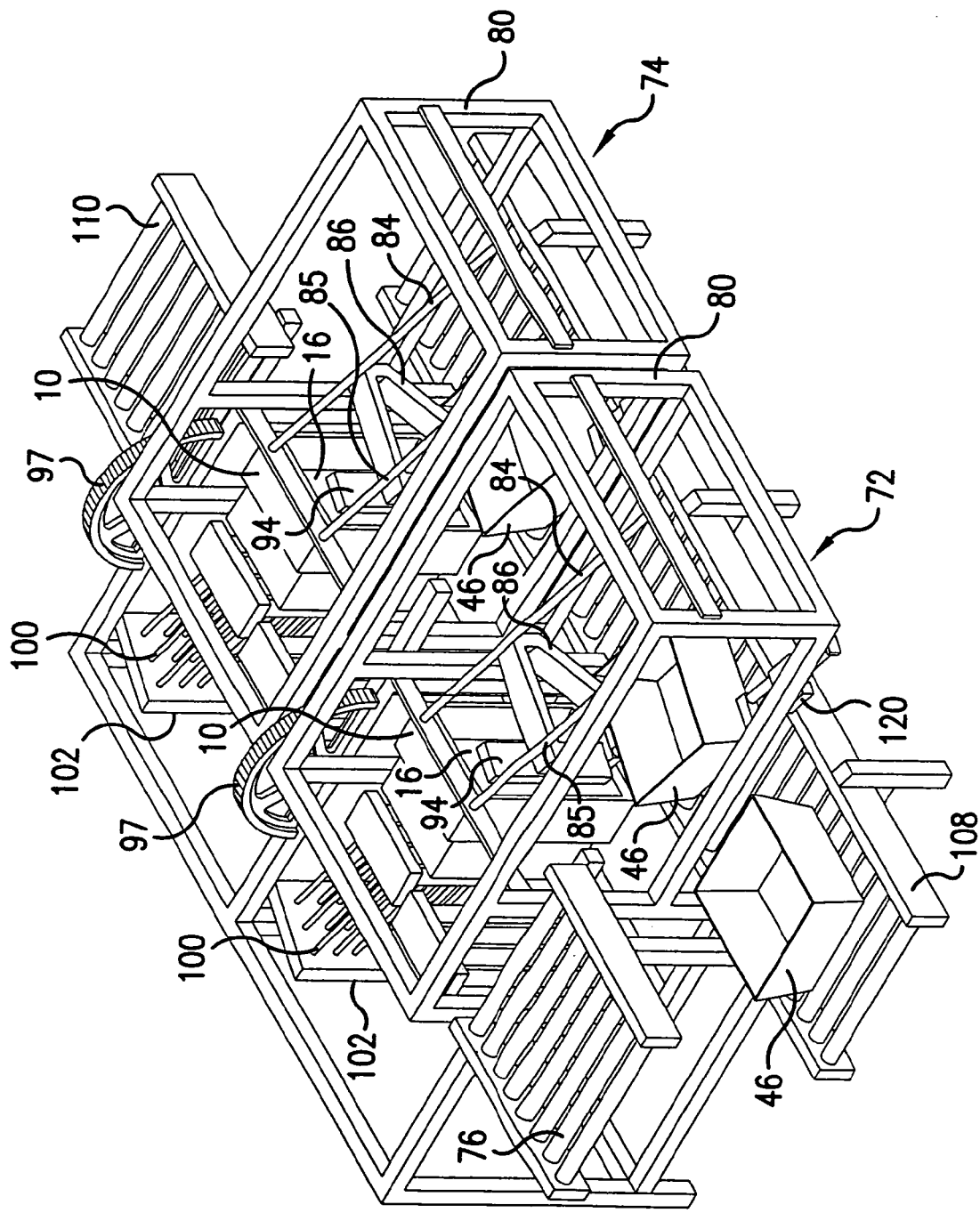

FIG. 16 is included to illustrate that there are actually two rotating stations 72 and 74 and that two mail reorientations may take place at the same time. FIG. 16 shows the two rotating stations 72 and 74 in a vertical orientation and FIG. 17 shows the two rotating stations after rotation to a horizontal orientation. While in the horizontal orientation the rods 100 are extended as illustrated with respect to rotating station 74 in FIGS. 10 and 11 to transfer the mail stack from a horizontal orientation in input tray 10 to the desired vertical orientation in output tray 46 for delivery.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. Apparatus for reorienting a mail stack, comprising:
   a mail input tray having a horizontally oriented mail stack therein, wherein:
      said mail input tray includes a plurality of apertures in the bottom thereof;
      said input tray includes an insert having a sloping wall portion and a sloping floor portion; and
      said sloping floor portion includes a plurality of apertures in a pattern matching that in said bottom of said input tray;
   a rotating station for receiving said input tray with said mail stack;
   a mail output tray positioned adjacent said rotating station;
   a plate;
   an actuator mechanism for placing said plate adjacent the top of said horizontally oriented mail stack for holding said mail stack in said input tray during a subsequent rotation process;
   a motor coupled to rotate said rotating station with said input tray, so that said mail stack therein assumes a vertical orientation; and
   ejection apparatus for ejecting said vertically oriented mail stack from said input tray to said output tray, wherein said ejection apparatus includes a plurality of pusher rods which are moved through said apertures in said bottom of said input tray and through said apertures in said sloping floor portion of said insert to contact the bottom of said mail stack.

2. Apparatus according to claim 1 wherein:
   said rotating station includes a frame;
   said actuator mechanism being carried by said frame.

3. Apparatus according to claim 2 wherein:
   said actuator mechanism includes first and second rods;
   a yoke assembly connected to said rods and moveable up and down said rods; and wherein
   said yoke assembly carries said plate.

4. Apparatus according to claim 1 wherein:
   said rotating station includes a horizontal transfer deck upon which said input tray is placed;

said transfer deck having a plurality of apertures therein;

said rods being vertically oriented beneath said apertures of said transfer deck and extendable therethrough to contact the bottom of said mail stack;

said rods being rotated to a horizontal orientation upon rotation of said rotating station.

5. Apparatus according to claim 1 wherein:

said rods are horizontally oriented and remain so during rotation of said rotating station.

6. Apparatus according to claim 1 wherein:

said rods and said plate adjacent the top of said horizontally oriented mail stack for holding said mail stack in said input tray define a space that is maintained constant.

7. Apparatus according to claim 1 which includes:

an input tray feed conveyer for delivering said input tray to said rotating station.

8. Apparatus according to claim 7 which includes:

an input tray take away conveyer.

9. Apparatus according to claim 8 wherein:

said input tray feed conveyer and said input tray take away conveyer are perpendicular to one another.

10. Apparatus according. to claim 9 wherein:

said rotating station includes a frame;

said rotating station includes a horizontal transfer deck upon which said input tray is placed;

said frame carries an ejection mechanism to transfer said input tray from said transfer deck to said input tray take away conveyer.

11. Apparatus according to claim 8 wherein:

said input tray feed conveyer and said input tray take away conveyer are in line with respect to one another.

12. Apparatus according to claim 1 which includes:

an output tray feed conveyer for delivering said output tray to said position adjacent said rotating station.

13. Apparatus according to claim 12 which includes:

an output tray take away conveyer.

14. Apparatus according to claim 13 wherein:

said output tray feed conveyer and said output tray take away conveyer are perpendicular to one another.

15. Apparatus according to claim 13 wherein:

said output tray feed conveyer and said output tray take away conveyer are in line with respect to one another.

16. Apparatus according to claim 1 which includes:

an input tray feed conveyer and an input tray take away conveyer in line with said input tray feed conveyer;

an output tray feed conveyer and an output tray take away conveyer in line with said output tray feed conveyer; and which includes a plurality of said rotating stations arranged at different positions along said input tray feed conveyer.

17. A method of reorienting a mail stack, comprising the steps of:

providing a mail input tray having a horizontally oriented mail stack, wherein said providing provides a mail input tray with a plurality of apertures in the bottom thereof and an insert within said input tray and having a sloping wall portion and a sloping floor portion with a similar plurality of apertures;

moving a plurality of rods through said apertures in the bottom of said input tray and said sloping floor portion of said insert to push on the bottom of said mail stack;

providing a mail output tray;

moving said input tray to a rotating station;

securing the top of said mail stack with a plate;

rotating said rotating station with said input tray so that said mail stack assumes a vertical orientation;

simultaneously moving said rods and said plate at the same rate until said mail stack is ejected from said input tray;

ejecting said vertically oriented mail stack into said output tray;

removing the now empty input tray;

removing said output tray filed with said vertically oriented mail stack, for mail delivery.

18. A method according to claim 17 which includes the step of:

providing said input tray to said rotating station by means of an input tray feed conveyer.

19. A method according to claim 17 which includes the step of:

removing said empty input tray from said rotating station by means of an input tray take away conveyer.

20. A method according to claim 17 which includes the step of:

removing said output tray filed with said vertically oriented mail stack by means of an output tray take away conveyer.

21. A method according to claim 17 which includes the step of:

simultaneously rotating said input tray and said rods at said rotating station.

22. A method according to claim 17 which includes the step of:

rotating only said input tray at said rotating station while maintaining said rods in a horizontal orientation.

* * * * *